(12) United States Patent  (10) Patent No.: US 7,862,272 B2
Nakajima  (45) Date of Patent: Jan. 4, 2011

(54) CLIP

(75) Inventor: Takeshi Nakajima, Kanagawa (JP)

(73) Assignee: Piolax Inc., Yokohama-shi, Kanagawa-ken (JP)

( * ) Notice: Subject to any disclaimer, the term of this patent is extended or adjusted under 35 U.S.C. 154(b) by 248 days.

(21) Appl. No.: 11/628,152

(22) PCT Filed: May 31, 2005

(86) PCT No.: PCT/JP2005/009980

§ 371 (c)(1),
(2), (4) Date: Jan. 3, 2007

(87) PCT Pub. No.: WO2005/116460

PCT Pub. Date: Dec. 8, 2005

(65) Prior Publication Data

US 2008/0031703 A1   Feb. 7, 2008

(30) Foreign Application Priority Data

May 31, 2004  (JP) ............................ P2004-160767
May 27, 2005  (JP) ............................ P2005-155796

(51) Int. Cl.
*F16B 13/06*  (2006.01)
(52) U.S. Cl. .............................. 411/45; 411/41; 411/46; 411/47; 411/48; 411/510
(58) Field of Classification Search .................. 411/41, 411/45–48, 510
See application file for complete search history.

(56) References Cited

U.S. PATENT DOCUMENTS 3,550,498 A  * 12/1970 Briles .......................... 411/432

(Continued)

FOREIGN PATENT DOCUMENTS

CN   1340136 A   3/2002

(Continued)

OTHER PUBLICATIONS

Chinese Office Action dated Feb. 22, 2008 with English Translation.
Japanese Office Action dated Jul. 14, 2009 with English-language translation.

*Primary Examiner*—Victor Batson
*Assistant Examiner*—Roberta Delisle
(74) *Attorney, Agent, or Firm*—McGinn IP Law Group, PLLC

(57) ABSTRACT

A clip which is easily removed from an object to be fixed is provided. The clip includes: two parts including a first member 1 and a second member 2, the first member having a head portion 4 and a shaft portion 5, and the second member having a flange portion 11 and a leg portion 12, wherein an opening 13 is formed in the flange portion of the second member, and the leg portion of the second member is split into two split leg portions 16 to form a gap 17, which communicates with the opening and into which the shaft portion of the first member is inserted between the split leg portions 16, and wherein elastic blades 18 projecting radially are provided in multiple stages along a vertical direction on outer peripheral surfaces of the split leg portions. Consequently, if the shaft portion of the first member is pulled out from the gap between the split leg portions of the second member, the shaft portion of the first member ceases to be present in the gap formed between the split leg portions of the second member. Therefore, if the first member together with the second member is subsequently removed from the object to be fixed while the head portion of the first member is being gripped, the split leg portions are greatly deflected inwardly by making use of the gap, so that it becomes possible to easily remove the clip itself.

16 Claims, 12 Drawing Sheets

U.S. PATENT DOCUMENTS

| | | | | |
|---|---|---|---|---|
| 4,122,583 | A * | 10/1978 | Grittner et al. | 24/703.1 |
| 4,276,806 | A * | 7/1981 | Morel | 411/41 |
| 4,312,614 | A * | 1/1982 | Palmer et al. | 411/44 |
| 4,375,342 | A * | 3/1983 | Wollar et al. | 411/41 |
| 4,396,329 | A * | 8/1983 | Wollar | 411/508 |
| 4,405,272 | A * | 9/1983 | Wollar | 411/41 |
| 4,571,134 | A * | 2/1986 | Beglinger et al. | 411/41 |
| 4,840,523 | A | 6/1989 | Oshida | |
| 4,871,289 | A * | 10/1989 | Choiniere | 411/48 |
| 4,952,106 | A * | 8/1990 | Kubogochi et al. | 411/48 |
| 5,028,187 | A * | 7/1991 | Sato | 411/48 |
| 5,163,795 | A * | 11/1992 | Benoit et al. | 411/45 |
| 5,201,623 | A * | 4/1993 | Benedetti et al. | 411/41 |
| 5,211,519 | A * | 5/1993 | Saito | 411/45 |
| 5,261,772 | A * | 11/1993 | Henninger et al. | 411/46 |
| 5,370,484 | A * | 12/1994 | Morikawa et al. | 411/48 |
| 5,375,954 | A * | 12/1994 | Eguchi | 411/48 |
| 5,387,065 | A * | 2/1995 | Sullivan | 411/48 |
| 5,562,375 | A * | 10/1996 | Jackson | 411/48 |
| 5,568,675 | A * | 10/1996 | Asami et al. | 24/453 |
| 5,641,255 | A * | 6/1997 | Tanaka | 411/48 |
| 5,689,863 | A * | 11/1997 | Sinozaki | 24/297 |
| 5,775,860 | A * | 7/1998 | Meyer | 411/46 |
| 5,813,810 | A * | 9/1998 | Izume | 411/510 |
| 5,934,729 | A * | 8/1999 | Baack | 296/39.1 |
| 6,039,523 | A * | 3/2000 | Kraus | 411/48 |
| 6,045,309 | A * | 4/2000 | LeVey | 411/45 |
| 6,196,756 | B1 * | 3/2001 | Leverger | 403/326 |
| 6,264,393 | B1 * | 7/2001 | Kraus | 403/282 |
| 6,287,043 | B1 * | 9/2001 | Kraus | 403/297 |
| 6,364,586 | B1 * | 4/2002 | Okada | 411/41 |
| 6,398,473 | B1 * | 6/2002 | Kraus | 411/508 |
| 6,481,942 | B2 * | 11/2002 | Tanaka | 411/45 |
| 6,511,273 | B2 * | 1/2003 | Arisaka | 411/48 |
| 6,533,515 | B2 * | 3/2003 | Meyer | 411/45 |
| 6,575,681 | B2 * | 6/2003 | Kojima et al. | 411/508 |
| 6,685,407 | B1 * | 2/2004 | Holzman et al. | 411/48 |
| 6,769,849 | B2 * | 8/2004 | Yoneoka | 411/45 |
| 6,827,536 | B1 | 12/2004 | Leon | |
| 7,018,152 | B2 * | 3/2006 | Arisaka | 411/41 |
| 2003/0129040 | A1 * | 7/2003 | Arisaka | 411/41 |
| 2003/0143053 | A1 * | 7/2003 | Kanie | 411/45 |
| 2004/0020016 | A1 * | 2/2004 | Yoneoka | 24/297 |
| 2005/0123372 | A1 | 6/2005 | Sato | |

FOREIGN PATENT DOCUMENTS

| | | |
|---|---|---|
| JP | 40-22404 | 10/1965 |
| JP | 52-01266 | 1/1977 |
| JP | 60-156207 | 10/1985 |
| JP | 62-71410 | 5/1987 |
| JP | 63-3513 | 1/1988 |
| JP | 63-68505 | 5/1988 |
| JP | 63-275805 | 11/1988 |
| JP | 63-275805 A | 11/1988 |
| JP | 64-14912 | 1/1989 |
| JP | 1-89610 | 6/1989 |
| JP | 4-138117 | 12/1992 |
| JP | 06-069415 | 9/1994 |
| JP | 08-159125 | 6/1996 |
| JP | 11-325013 A | 11/1999 |
| JP | 2001-221212 A | 8/2001 |
| JP | 2001-336515 A | 12/2001 |
| JP | 2002-019440 | 1/2002 |
| JP | 2002-019440 A | 1/2002 |
| JP | 2002-106519 | 4/2002 |
| JP | 2002-106519 A | 4/2002 |
| JP | 2002-349526 A | 12/2002 |
| JP | 2003-182434 A | 7/2003 |
| JP | 2003-182436 | 7/2003 |
| JP | 2003-232318 | 8/2003 |
| JP | 2003-232318 A | 8/2003 |

\* cited by examiner

CLIP

TECHNICAL FIELD

The present invention relates to a so-called tree type clip, which is used, for example, when an upholstery material of an automobile is fixed to a vehicle body panel.

BACKGROUND ART

A conventional clip of this type, although not specifically illustrated in the drawings, is molded from a synthetic resin as a single piece, consists of a head portion and a shaft portion extended from a lower surface of the head portion, and is constructed such that radially extending elastic blades are provided in multiple stages along the vertical direction on opposing outer peripheral surfaces of the shaft portion (e.g., refer to patent document 1).

In a case where a roof trim, which is an upholstery material of an automobile, is fixed to a roof panel by using this conventional clip, the roof trim is superposed on the roof panel to obtain a state in which their mounting holes are aligned, and the shaft portion is pressed into the mounting holes. Then, in the process in which the elastic blades are passed through the mounting holes, the elastic blades are pressed and curved by inner peripheral surfaces of the mounting holes, and the elastic blades after passing to the reverse surface side of the mounting holes return to their original state, thereby preventing the shaft portion from coming off the mounting holes. As a result, the roof trim is fixed to the roof panel.

Patent document 1: JP-A-8-159125

DISCLOSURE OF THE INVENTION

Problems that the Invention is to Solve

Accordingly, with the conventional clip, there is an advantage in that the roof trim can be fixed to the roof panel side with a single motion by effectively absorbing the total plate thickness of the roof trim and the roof panel by selectively using the multi-stage elastic blades. On the other hand, however, in a case where the clip is removed from the mounting holes to cancel the fixed state of the roof trim and the roof panel, the clip must be pulled out by force while greatly curving the multi-stage elastic blades in the opposite direction. Therefore, it is ordinarily inevitable to use a tool such as a slotted screwdriver. When the object to be fixed is formed of an easily damageable material as in the case of the roof trim, in particular, the use of a tool requires considerable caution in the pulling-out operation. Hence, there has been a drawback in that the pulling-out operation in itself is quite troublesome in conjunction with the use of the tool itself.

Means for Solving the Problems

The invention has been developed to effectively overcome the problems of the above-described conventional clip, and in the invention according to claim 1, the clip includes a first member having a head portion and a shaft portion that is extended from a lower surface of the head portion, and the second member having a flange portion that is formed with an opening and a leg portion that is split into two split leg portions to form a gap therebetween, which communicates with the opening and into which the shaft portion of the first member is inserted, and wherein elastic blades projecting radially are provided in multiple stages along a vertical direction on outer peripheral surfaces of the split leg portions so that the mutual approach of the split leg portions is prevented when the shaft portion of the first member is inserted into the gap between the split leg portions through the opening.

The invention according to claim 2 is based on claim 1, and is characterized in that an engaging shoulder is provided on an inner peripheral surface side of the opening formed in the flange portion of the second member, and a locking projection is provided on an outer peripheral surface close to a distal end of the shaft portion of the first member, wherein the locking projection is inseparably engaged with the engaging shoulder when the shaft portion is pulled out from the gap between the split leg portions.

The invention according to claim 3 is based on claims 1 and 2, and is characterized in that a side locking projection is provided on the outer peripheral surface close to the distal end of the shaft portion of the first member, and the side locking projection abuts against a lower surface of the flange portion of the second member when the shaft portion is pulled out from the gap between the split leg portions.

The invention according to claim 4 is based on claims 2 and 3, and is characterized in that an assembling projection is provided on the outer peripheral surface close to a proximal end of the shaft portion of the first member, and the assembling projection is seperably engaged with the engaging shoulder on the second member side when the shaft portion is inserted into the gap between the split leg portions.

The invention according to claim 5 is based on claim 1, and is characterized in that when the shaft portion of the first member is inserted into the gap between the split leg portions, at least the shaft portion and a lower end portion of each of the split leg portions are inseparably connected to each other, while when the shaft portion is pulled out from the gap between the split leg portions, the connection between the shaft portion and the lower end portion of each of the split leg portions is canceled.

The invention according to claim 6 is based on claim 4, and is characterized in that a portion of the shaft portion beneath a portion where the assembling projection of the first member is provided is formed as a narrow diameter portion.

The invention according to claim 7 is based on claims 1 to 6, and is characterized in that a U-groove which is parallel to each of the split leg portions is formed in the lower surface of the flange portion of the second member.

The invention according to claim 8 is based on claim 1, and is characterized in that a pair of ribbed walls are provided diagonally continuously on the shaft portion of the first member to allow the ribbed walls and the shaft portion to form an S-shaped cross section, and a pair of engaging-in portions which each engage into a gap between a side surface of the shaft portion and an inner peripheral surface of each of the ribbed walls are provided diagonally on the split leg portions of the second member.

The invention according to claim 9 is based on claim 1, and is characterized in that a distal end edge of the first member and an opening edge of the flange portion of the second member are integrally formed by means of a small bridge piece, and the head portion of the first member is subsequently pressed to integrate the shaft portion of the first member and the leg portion of the second member.

The invention according to claim 10 is based on claim 9, and is characterized in that the shaft portion of the first member has a central portion formed in a prismatic shape, and a T-shape is imparted to each of both sides of the central portion, T-shaped portions on a distal end side of the shaft portion being shaved off into tapered surfaces, to thereby form a remaining portion of the distal end of the shaft portion into a rectangular cross-sectional shape, the shaft portion of the first member being connected at four corners of the rectangular cross-sectional shape to an opening edge of the flange portion of the second member by means of small bridge pieces.

The invention according to claim 11 is based on claim 2, and is characterized in that the shaft portion of the first member has a central portion formed in a prismatic shape, and a T-shape is imparted to each of both sides of the central portion, T-shaped portions on a distal end side of the shaft portion being shaved off into tapered surfaces, to thereby form a remaining portion of the distal end of the shaft portion into a rectangular cross-sectional shape, the locking projection being provided at a portion of the rectangular cross-sectional shape.

The invention according to claim 12 is based on claim 1, and is characterized in that the shaft portion of the first member has a prismatic shape, and its corner portions which are present diagonally are notched, while the gap formed between the split leg portions of the second member is made similar to a cross-sectional shape of the shaft portion.

The invention according to claim 13 is based on claims 1 to 12, and is characterized in that a gap is formed between the head portion of the first member and the flange portion of the second member, and an outside diameter of the head portion is made larger than an outside diameter of the flange portion.

Advantage of the Invention

Accordingly, in the invention according to claim 1, in the case where an object to be fixed is fixed, if the shaft portion of the first member is inserted into the gap formed between the split leg portions of the second member, and is pushed into a mounting hole of the object to be fixed, the mutual approach of the split leg portions is prevented. Therefore, in the same way in the conventional case, the object to be fixed can be reliably fixed by virtue of the action of the multi-stage elastic blades provided on the outer peripheral surfaces of the split leg portions.

On the other hand, in a case where the clip itself is removed from a mounting hole of the object to be fixed to cancel the fixed state of the object to be fixed, if the shaft portion of the first member is pulled out from the gap between the split leg portions of the second member, the shaft portion of the first member ceases to be present in the gap formed between the split leg portions of the second member. Therefore, if the first member together with the second member is subsequently removed from the object to be fixed while the head portion of the first member is being gripped, the split leg portions are greatly deflected inwardly by making use of the gap, so that it becomes possible to easily remove the clip itself with a light force by the operator's fingers without using a tool. In addition, since it becomes practically unnecessary to curve the multi-stage elastic blades in the opposite direction, if the clip is reused after removal, a reduction in its holding force is small.

In the invention according to claim 2, in a case where the clip is removed from a mounting hole of the object to be fixed, if an attempt is made to pull out the shaft portion of the first member from the leg portion of the second member, the locking projection provided on the shaft portion of the first member is inseparably engaged with the engaging shoulder provided on the inner peripheral surface side of the opening of the second member, so that it becomes possible to remove the second member together with the first member with a light force.

In the invention according to claim 3, in a case where the clip is removed from a mounting hole of the object to be fixed, if an attempt is made to pull out the shaft portion of the first member from the leg portion of the second member, the locking projection is engaged with the engaging shoulder, and the side locking projection abuts against the lower surface of the flange portion of the second member, so that it is possible to more reliably prevent the first member and the second member from becoming erroneously separated.

In the invention according to claim 4, if the shaft portion of the first member is inserted into the gap between the split leg portions, the assembling projection provided on the shaft portion of the first member is engaged with the engaging shoulder provided on the inner peripheral surface side of the opening of the second member, so that, there is no possibility of the both members coming apart during delivery or handling. In addition, since the assembling projection and the engaging shoulder are separably engaged, the first member can be pulled out from the second member without an excessive force.

In the invention according to claim 5, if the shaft portion of the first member is inserted into the gap between the split leg portions of the second member, the shaft portion and the split leg portions are connected to each other so as to be incapable of being moved away from each other. Therefore, if the clip in this state is inserted into the mounting hole of the object to be fixed, even if lower end edges of the split leg portions 16 collide against and contact a hole edge of the mounting hole, there is no possibility that lower end portions of the split leg portions 16 become inadvertently turned up and cannot be pressed in.

In the invention according to claim 6, in connection with the fact that a narrow diameter portion is formed at a portion of the shaft portion beneath the portion where the assembling projection is provided, in the case where the shaft portion of the first member is pulled out from the second member side by canceling the engagement between the assembling projection and the engaging shoulder, the pulling-out resistance decreases particularly during the early period, so that the pulling out is facilitated.

In the invention according to claim 7, in connection with the fact that the lower surface of the flange portion of the second member has a U-groove, in cases such as where the total plate thickness of the object to be fixed is thin, it would be fairly difficult for portions of the split leg portions close to the flange portion to be inwardly deflected. However, at this time, since the flange portion itself of the second member is deflected by means of the U-groove, it becomes possible to promote the inward deflection of the split leg portions.

In the invention according to claim 8, in connection with the fact that a pair of ribbed walls are provided diagonally on the shaft portion of the first member to allow the ribbed walls and the shaft portion to form an S-shaped cross section, the wall thickness of the ribbed walls and the shaft portion can be made thick, making it possible to obtain high rigidity. At the same time, in the integrated state of the first member and the second member, the shape of the distal end can be made slender, so that the guidability also improves. In addition, in connection with the fact that the engaging-in portion of the split leg portion is engaged into the gap between the side surface of the shaft portion and the inner surface of the ribbed wall, the shaft portion and a lower end portion of each split leg portion are connected so as to be incapable of being moved away from each other.

In the invention according to claim 9, in connection with the fact that a distal end edge of the first member and an opening edge of the flange portion of the second member are integrally formed by means of a small bridge piece, the first member and the second member can be integrated by merely pressing the head portion of the first member toward the interior of the leg portion of the second member while cutting off the small bridge piece, so that the assembling operation of the both members is made considerably easy.

In the invention according to claim 10, in connection with the fact that the shaft portion of the first member is connected at four distal end corners of its distal end of a rectangular cross section to an opening edge of the flange portion of the second member by means of small bridge pieces, it is possible to effectively prevent the first member from tilting or shaking with respect to the second member while making it possible to cut off the small bridge pieces with a small force, so that the operation of assembling the both members can be performed more easily. In addition, by virtue of the presence of the tapered surfaces, even if cutting dust and the like occur, the shaft portion of the first member can be reliably inserted into the gap on the second member side.

In the invention according to claim 11, in connection with the fact that the locking projection is provided at the distal end of the shaft portion having the rectangular cross-sectional shape in the first member, it becomes possible to position the locking projection on the distal end side of the shaft portion as much as possible. Therefore, when the locking projection is engaged with the engaging shoulder on the second member side, hindrances are no longer present in the gap formed between the split leg portions of the second member, so that the split leg portions can be easily deflected inwardly.

In the invention according to claim 12, in connection with the fact that corner portions which are present diagonally at the prismatic shaft portion of the first member are notched, and the gap on the second member side is made similar to the cross-sectional shape of the shaft portion, in a case where a load is applied in the widthwise direction of the shaft portion, the projecting end edge of the shaft portion abuts against the hole edge of the mounting hole of the object to be fixed, thereby making it possible to prevent an offset. At the same time, the toppling of each split leg portion toward the shaft portion side can be prevented, and the rattling of the split leg portions and the hole edge of the mounting hole can also be prevented.

In the invention according to claim 13, in connection with the fact that a gap is formed between the head portion of the first member and the flange portion of the second member, when an attempt is made to pull out the shaft portion of the first member from the gap between the split leg portions, the head portion of the first member can be lifted up, so that the operation can be performed quite easily.

DESCRIPTION OF REFERENCE NUMERALS

Figure 1:
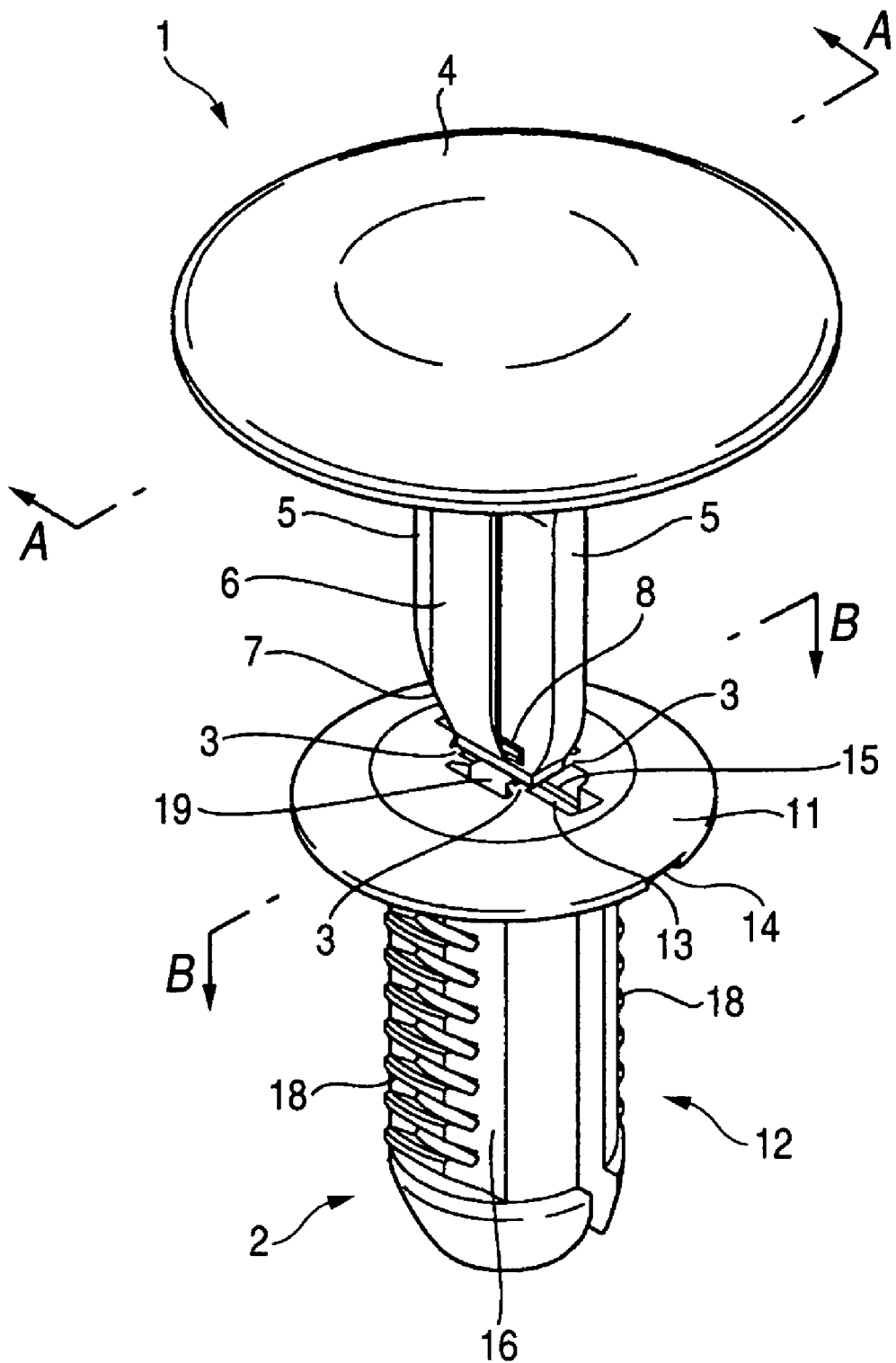
FIG. 1 is an external perspective view illustrating a clip according to a first embodiment of the invention.

1: first member
2: second member
3: small bridge piece
4: enlarged head portion
4a: stepped portion
5: shaft portion
5a: notched portion
6: ribbed wall
7: tapered surface
8: locking projection
9: assembling projection
10: narrow diameter portion
11: flange portion
11a: stepped portion
12: leg portion
13: opening
14: U-groove
15: engaging shoulder
16: split leg portion
16a: projecting portion
16b: engaging-in portion
17: gap
18: elastic blade
19: connecting groove
20: gap
21: side locking projection
P1: roof trim
H1: mounting hole
P2: roof panel
H2: mounting hole

BEST MODE FOR CARRYING OUT THE INVENTION

In the invention, a clip of a so-called tree type is configured to include a first member and a second member, and the first member and the second member are organically combined. In a case where an object to be fixed is fixed, as the first member is inserted into the second member side, integration of the first member and the second member is obtained, and the clip is used as it is. On the other hand, in a case where the clip is to be removed from a mounting hole of the object to be fixed to cancel the fixed state of the object to be fixed, the first member is pulled out from the second member side only by a necessary portion to inwardly deflect split leg portions of the second member, thereby making it possible to simply remove the first member together with the second member from the mounting hole.

First Embodiment

Figure 2:
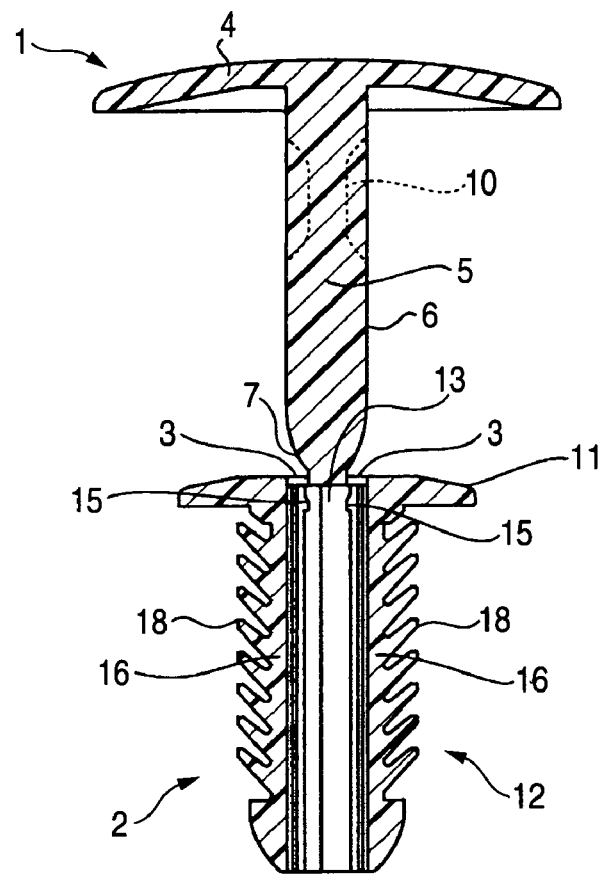
FIG. 2(A) is a cross-sectional view taken along line A-A in FIG. 1.
FIG. 2(B) is a cross-sectional view taken along line B-B in FIG. 1.
Figure 2:
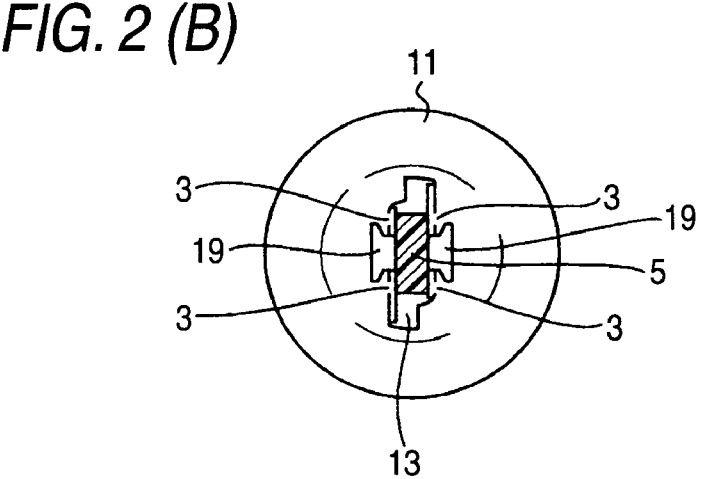

Hereafter, a detailed description will be given of the invention on the basis of the preferred embodiments illustrated in the drawings. The clip according to a first embodiment differs from the conventional single piece, and consists of two parts including a first member 1 and a second member 2. The characteristic feature lies in that the first member 1 and the second member 2 are one-piece molded from a synthetic resin as shown in FIG. 1. It should be noted that, in the integral molding, the arrangement provided is such that, as also shown in FIG. 2, the first member 1 and the second member 2 are offset from each other in the axial direction, and are connected to each other by four small bridge pieces 3 while a distal end of a below-described shaft portion 5 of the first member 1 is aligned with edges of a below-described opening 13 of the second member 2. In this state, the first member 1 is pressed into the second member 2 while cutting off the small bridge pieces 3, thereby making it possible to obtain a state of integration of the first member 1 and the second member 2 very simply.

Figure 3:
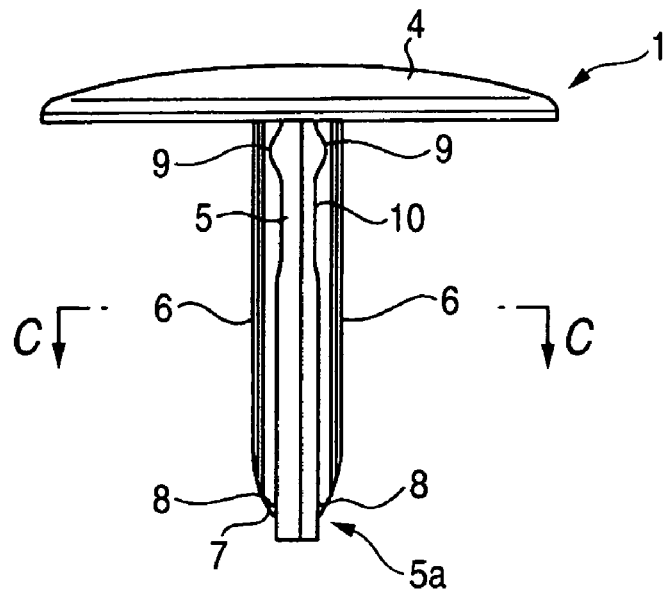
FIG. 3(A) is a front elevational view illustrating a first member.
FIG. 3(B) is a side elevational view thereof.
Figure 3:
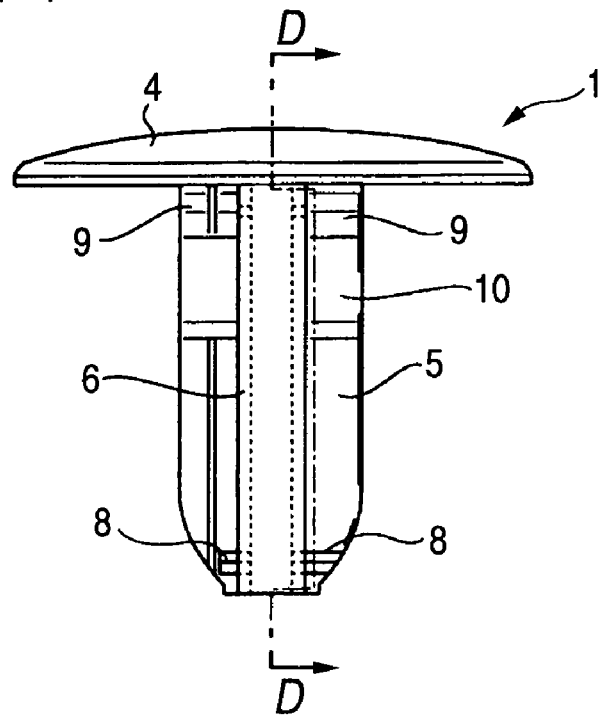
Figure 4:
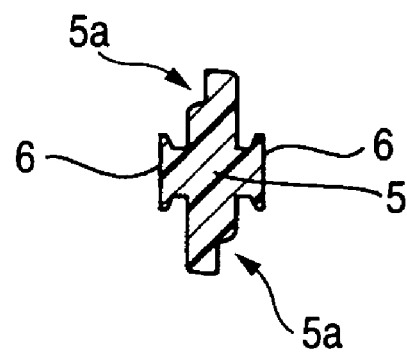
FIG. 4(A) is a cross-sectional view taken along line C-C in FIG. 3(A)
FIG. 4(B) is a cross-sectional view taken along line D-D in FIG. 3(B)
Figure 4:
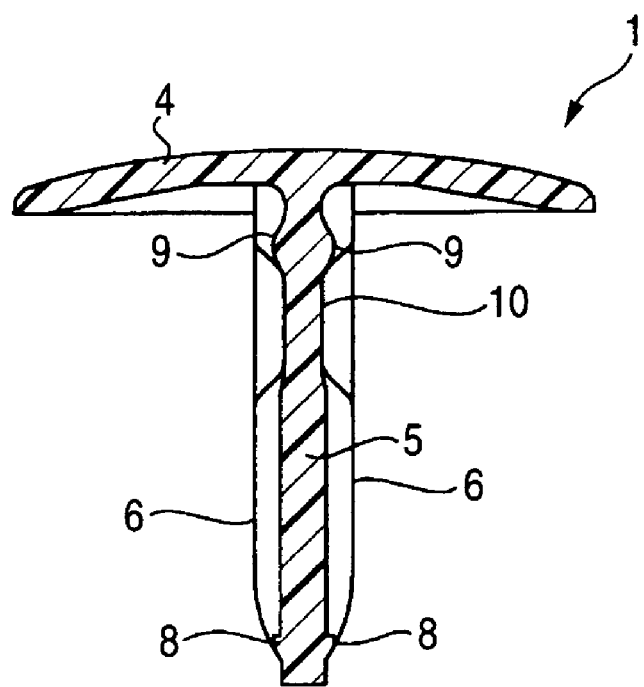

Accordingly, at first, a description will be given of the structure of the first member 1. As shown in FIGS. 3 and 4 as well, the first member 1 includes a disk-shaped enlarged head portion 4 provided with a size suitable for gripping as well as the shaft portion 5 which is prismatic and is extended from the lower surface of the enlarged head portion 4. As for the latter shaft portion 5, its corner portions which are present diagonally are notched at 5a to show a cross-sectional shape in which it is transversely offset with respect to the widthwise direction with a center line as a boundary. Further, a pair of ribbed walls 6, each of which has a T-shape for engaging into a connection groove 19 of the below-described second member 2, are formed continuously on its both side surfaces in the axial direction. In particular, each of the ribbed walls 6 on the distal end side of the shaft portion 5 is shaved off into a tapered surface 7 to thereby form only a remaining portion thereof into a rectangular cross-sectional shape, and the aforementioned small bridge pieces 3 are connected to four corners of the rectangular cross-sectional shape. Further, a pair of locking projections 8, which are respectively engaged inseparably with engaging shoulders 15 of the below-described second member 2, are provided on respective upper outer peripheral surfaces of the small bridge pieces 3. It should be noted that in connection with the fact that the locking projection 8 is inseparably engaged with the engaging shoulder 15, an upper surface side of the locking projection 8 is formed into an orthogonal engaging surface, and a lower surface side thereof is formed into a tapered surface.

In addition, a pair of assembling projections 9, which is separably engaged with the engaging shoulders 15 of the below-described second member 2, is this time provided on the outer peripheral surfaces close to a proximal end of the shaft portion 5 on the enlarged head portion 4 side. In connection with the fact that the assembling projection 9 is separably engaged with the engaging shoulder 15, upper and lower surfaces of the assembling projection 9 are formed into tapered surfaces. Further, a construction is concurrently adopted in which portions of the shaft portion 5 beneath the portions where the assembling projections 9 are provided are formed as narrow diameter portions 10.

Figure 5:
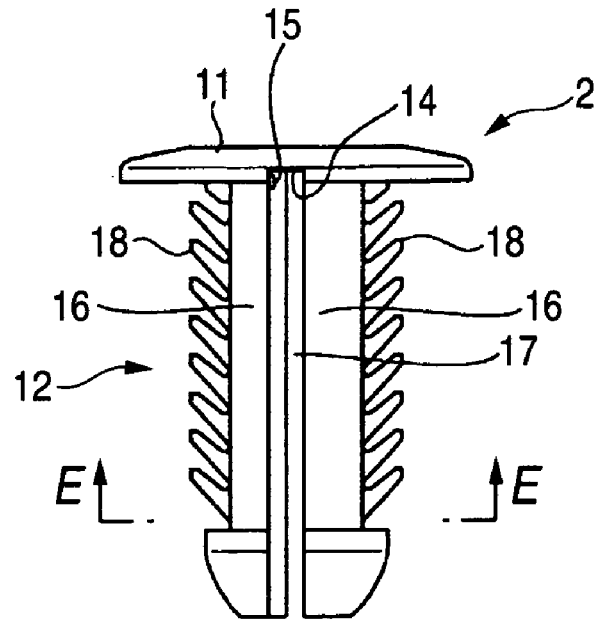
FIG. 5(A) is a front elevational view illustrating a second member.
FIG. 5(B) is a cross-sectional view taken along line E-E in FIG. 5(A)
Figure 5:
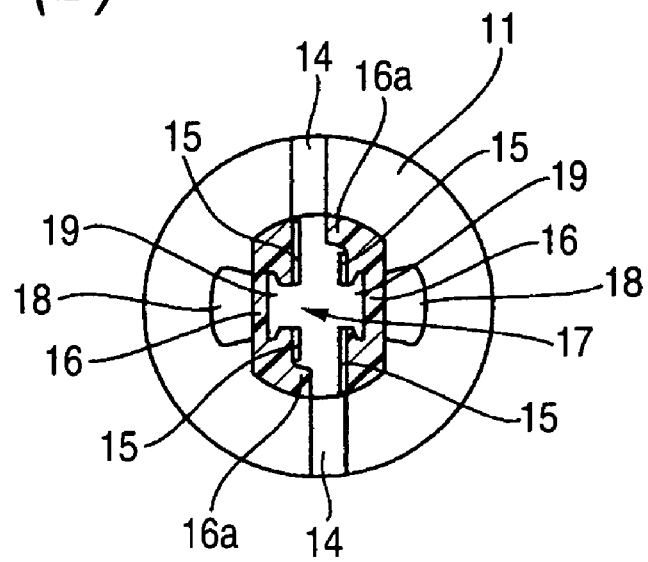

Next, a description will be given of the second member 2. As shown in FIG. 5 as well, the second member 2 including a disk-shaped flange portion 11, which is smaller the enlarged head portion 4 of the first member 1 as well as a cylindrical leg portion 12 extended from a lower surface of the flange portion 11. In the former flange portion 11, the opening 13, which communicates with a below-described gap 17 is formed in its center, and a pair of U-grooves 14 extending in parallel to a below-described pair of split leg portions 16 with the opening 13 located therebetween, are formed in a lower surface of the flange portion 11. At the same time, the engaging shoulders 15, which are individually engaged with the locking projections 8 and the assembling projections 9 of the above-described first member 1, are provided on lower sides of opposing inner peripheral surfaces of the opening 13. It should be noted that lower surfaces of these engaging shoulders 15 are formed into orthogonal engaging surfaces.

In addition, the latter leg portion 12 is constructed such that the leg portion 12 is split bilaterally symmetrically into two parts to form the gap 17, which communicates with the opening 13 and into which the shaft portion 5 of the first member 1 is inserted between the pair of split leg portions 16, and a pair of projecting portions 16a, which project inwardly and oppose the notched portions 5a of the shaft portion 5, are provided at side edges, which are present diagonally in the respective split leg portions 16. Therefore, the gap 17 is similar to the cross-sectional shape of the shaft portion 5 excluding the ribbed walls 6. Further, elastic blades 18 projecting radially upwardly are provided in multiple stages along the vertical direction on outer peripheral surfaces of the respective split leg portions 16, while a pair of connecting grooves 19 of similar figures, into which the T-shaped ribbed walls 6 are held, are respectively formed on inner peripheral surfaces of the split leg portions 16.

Accordingly, in a case where a roof trim P1, which is an upholstery material of an automobile, is fixed to a roof panel P2, which is a vehicle body panel, by using the clip of the above-described construction, in order to integrate the one-piece molded first member 1 and second member 2 prior to doing so, the small bridge pieces 3 are first cut off inside or outside a molding die thereof, and the enlarged head portion 4 of the first member 1 is pressed to insert the shaft portion 5 of the first member 1 into the gap 17 formed between the split leg portions 16. In this case, in connection with the fact that the shaft portion 5 of the first member 1 is connected at the four distal end corners of its distal end of a rectangular cross section to the edges of the opening 13 of the flange portion 11 of the second member 2, the small bridge pieces 3 can be cut off with a small force without causing the first member 1 to tilt or shake with respect to the second member 2, so that the operation of assembling the both members 1 and 2 can be performed quite easily. In addition, by virtue of the presence of the tapered surfaces 7 at the distal end of the shaft portion 5, even if cutting dust and the like occur, the tapered surfaces 7 can be absorbed, thereby making it possible to reliably insert the shaft portion 5 of the first member 1 into the gap 17 on the second member 2 side.

Figure 6:
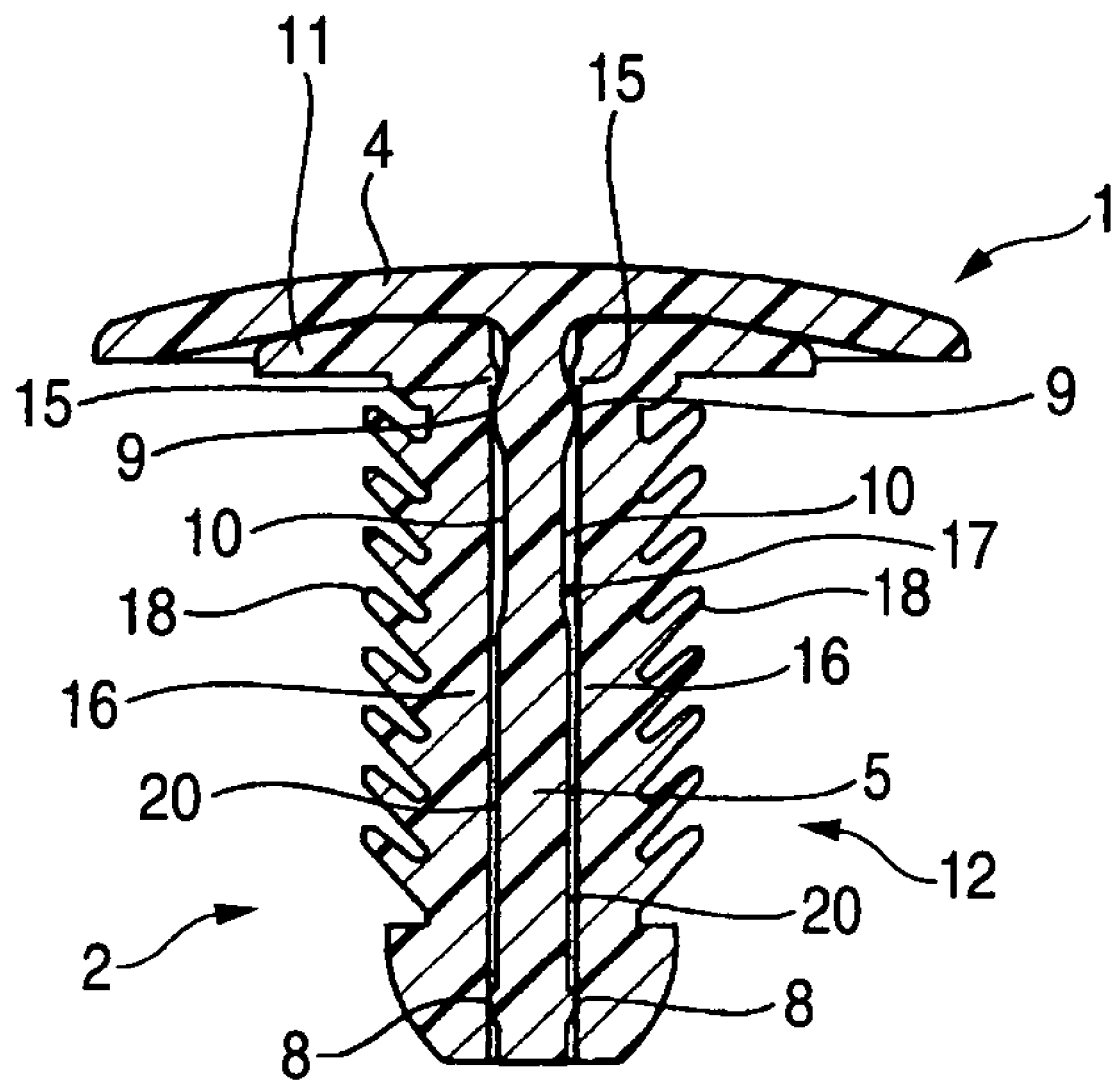
FIG. 6 is a cross-sectional view illustrating a state in which the first member and the second member are integrated.

In addition, in the integrated state of the first member 1 and the second member 2, as shown in FIG. 6, at the same time as the assembling projections 9 provided on the shaft portion 5 of the first member 1 are engaged with the engaging shoulders 15 provided on the inner peripheral surfaces of the opening 13 of the second member 2, the locking projections 8 are held in pressure contact with the inner peripheral surfaces of the corresponding split leg portions 16 on the lower end side.

Therefore, there is no possibility of the both members 1 and 2 coming apart during delivery or handling, and a slight gap 20 is formed continuously between each outer peripheral surface of the prismatic shaft portion 5 and an inner peripheral surface of each slit leg portion 16.

Accordingly, in the state in which the first member 1 and the second member 2 are integrated, the clip is no different from a conventional single-piece clip.

Figure 7:
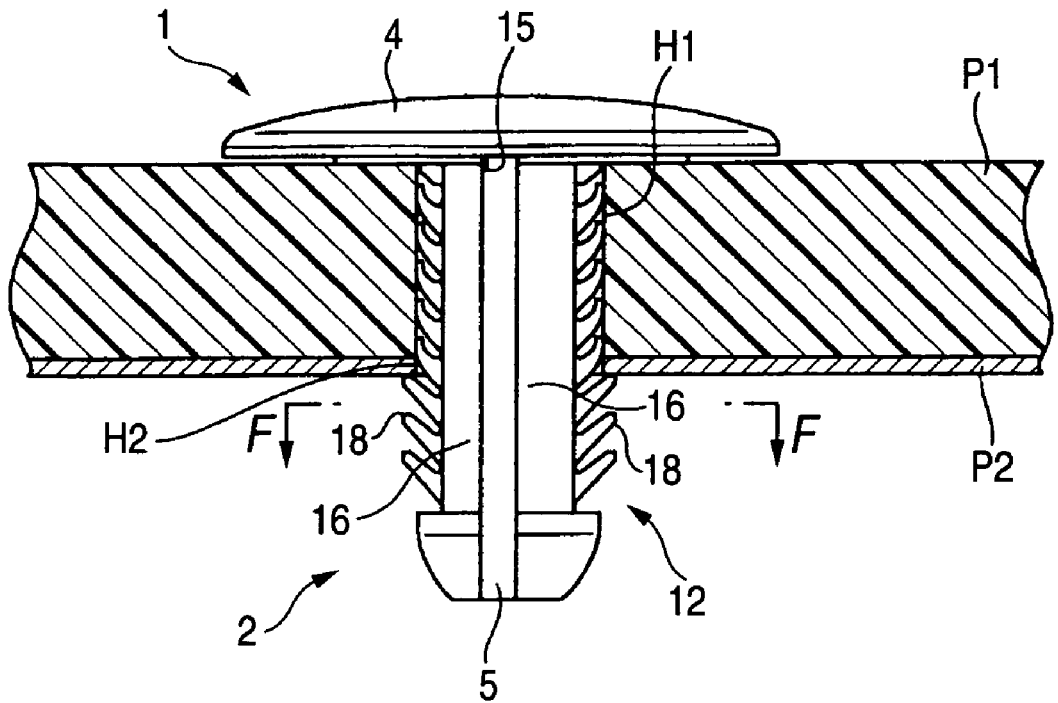
FIG. 7(A) is a cross-sectional view illustrating a state in which a roof trim is fixed to a roof panel by using the clip.
FIG. 7(B) is a cross-sectional view taken along line F-F in FIG. 7(A)
Figure 7:
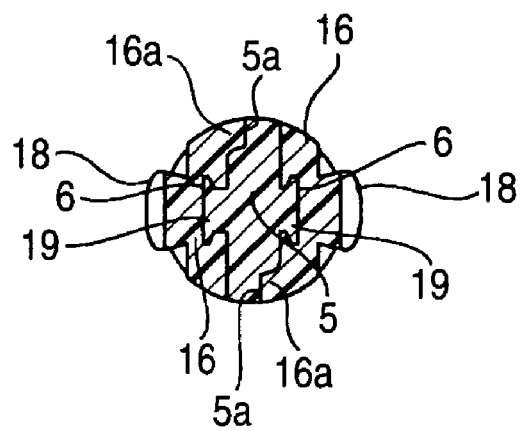

After obtaining the state of integration of the first member 1 and the second member 2, the roof trim P1 is superposed on the roof panel P2 to obtain a state in which their mounting holes H1 and H2 are aligned, and the leg portion 12 is pressed into the mounting holes H1 and H2. Then, in the process in which the elastic blades 18 provided in multiple stages on the outer peripheral surfaces of the split leg portions 16 are passed through the mounting holes H1 and H2, the elastic blades 18 are pressed and curved by the inner peripheral surfaces of the mounting holes H1 and H2, and the elastic blades 18 after passing to the reverse surface side of the mounting holes H1 and H2 return to their original state, thereby preventing the second member 2 from coming off the mounting holes H1 and H2. As a result, the roof trim P1 is fixed to the roof panel P2, as shown in FIG. 7.

Moreover, in this case, in connection with the fact that the shaft portion 5 of the first member 1 is inserted in the gap 17 between the split leg portions 16, the split leg portions 16 never approach each other, so that it is possible to obtain a reliably and firmly fixed state of the both members P1 and P2 in the same way as the conventional clip. In addition, at the time of pressing the leg 12 of the second member 2 into the mounting holes H1 and H2, even if lower end edges of the split leg portions 16 collide against and contact a hole edge of the mounting hole H1, since the shaft portion 5 of the first member 1 and each of the split leg portions 16 of the second member 2 are connected to each other so as to be incapable of being moved away from each other as the corresponding ribbed walls 6 and connecting grooves 19 are engaged with each other over their substantially entire lengths, there is no possibility that lower end portions of the split leg portions 16 become inadvertently turned up and that cannot be pressed into the mounting holes H1 and H2. At the same time, the lateral offset between the shaft portion 5 and the split leg portions 16 can be prevented effectively.

In addition, in connection with the fact that the notched portions 5a are present at the corner portions which are present diagonally at the prismatic shaped shaft portion 5 of the first member 1, and the projecting portions 16a are present at the side edges which are present diagonally in the respective split leg portions 16 of the second member 2, in a case where a load is applied in the widthwise direction of the shaft portion 5, the opposing projecting end edges of the shaft portion 5 abut against the hole edges of the mounting holes H1 and H2, thereby making it possible to prevent an offset. At the same time, the toppling of each split leg portion 16 toward the shaft portion 5 side can be prevented, and the rattling of the split leg portions 16 with respect to the hole edges of the mounting holes H1 and H2 can also be prevented.

Figure 8:
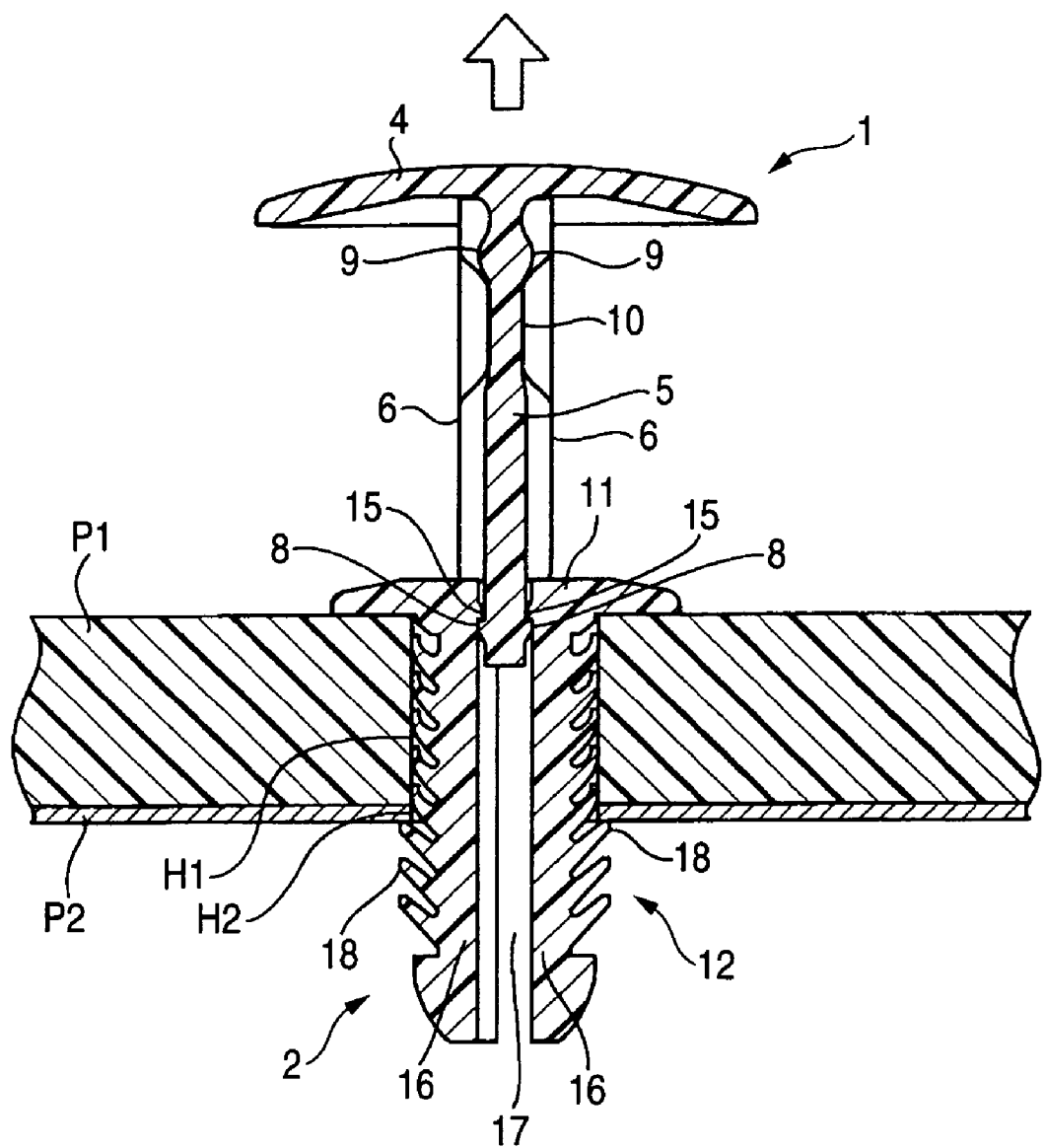
FIG. 8 is a cross-sectional view illustrating a state in which the first member is pulled out from a gap of the second member.

In a case where the clip itself is conversely removed from the mounting holes H1 and H2 to cancel the fixed state of the roof trim P1 and the roof panel P2, if the operator tries to pull out the shaft portion 5 of the first member 1 from the gap 17 between the split leg portions 16 of the second member 2 while gripping the enlarged head portion 4 of the first member 1 with his or her fingers, the shaft portion 5 of the first member 1 is gradually pulled up from the gap 17 between the split leg portions 16 by making use of the gaps 20 each formed between the shaft portion 5 and each split leg portion 16. This time, as shown in FIG. 8, the locking projections 8 are inseparably engaged with the engaging shoulders 15 provided on the inner peripheral surfaces of the opening 13. As a result, there are no longer hindrances which hamper the mutual approach of the split leg portions 16 inside the gap 17. Moreover, since the locking projections 8 are provided on the most distal end side of the shaft portion 5 as much as possible, as already described, hindrances are practically no longer present.

It should be noted that before the pulling out, the assembling projections 9 provided on the shaft portion 5 of the first member 1 are engaged with the engaging shoulders 15, as described above. However, since the assembling projections 9 are separably engaged with the engaging shoulders 15, the shaft portion 5 of the first member 1 can be pulled out from the gap 17 of the second member 2 without an excessive force. At the same time, since the narrow diameter portions 10 are formed at the portions beneath the assembling projections 9, in the case where the shaft portion 5 of the first member 1 is pulled out from the second member 2 side by canceling the engagement between the assembling projections 9 and the engaging shoulders 15, the pulling-out resistance decreases particularly during the early period, so that the pulling out is further facilitated.

Accordingly, if the first member 1 is subsequently removed from the mounting holes H1 and H2 together with the second member 2 in the locked state while the enlarged head portion 4 of the first member 1 is continued to be gripped, the split leg portions 16 are greatly deflected inwardly by making use of the gap 17. Therefore, even if the multi-stage elastic blades 18 are extended diagonally upward, it becomes practically unnecessary to curve the multi-stage elastic blades 18 in the opposite direction, so that the clip itself can be removed with a light force by the operator's fingers without using a tool in the conventional manner.

In addition, in the first embodiment, in connection with the fact that the U-grooves 14 are provided in the lower surface of the flange portion 11 of the second member 2, in cases such as where the total plate thickness of the roof trim P1 and the roof panel P2 is relatively thin, it would be fairly difficult for portions of the split leg portions 16 close to the flange portion 11 to be inwardly deflected. However, at this time, since the flange portion 11 itself of the second member 2 is deflected by means of the U-grooves 14, it becomes possible to effectively promote the inward deflection of the split leg portions 16, so that, in any case, the clip itself can be removed by the operator's fingers without using a tool. Accordingly, even if the roof trim P1 is formed of an easily damageable material, there is utterly no possibility of causing damage to the roof trim P1 inadvertently.

It should be noted that in a case where the clip, after being once removed from the mounting holes H1 and H2, is used again to fix the roof trim P1 and the roof panel P2, it would be sufficiently possible to integrate the first member 1 and the second member 2 in advance and push them as integrated as they are into the mounting holes H1 and H2, as described above. However, if the second member 2 alone is first singly pushed into the mounting holes H1 and H2, and the shaft portion 5 of the first member 1 is later pushed into the gap 17 of the second member 2, it becomes possible to push the leg portion 12 of the second member 2 having the multiple-stage elastic blades 18 into the mounting holes H1 and H2 with a small force.

Second Embodiment

Figure 9:
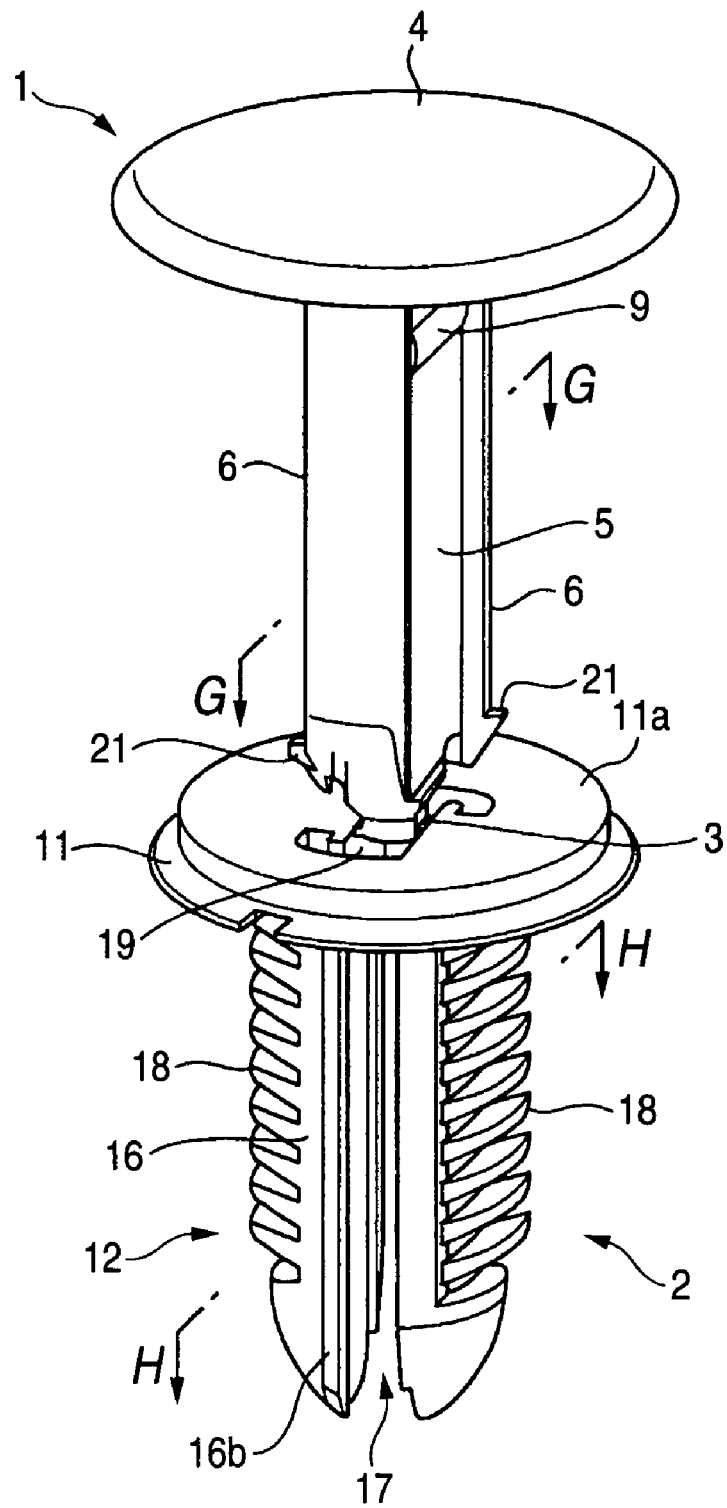
FIG. 9 is an external perspective view illustrating a clip according to a second embodiment of the invention.
Figure 10:
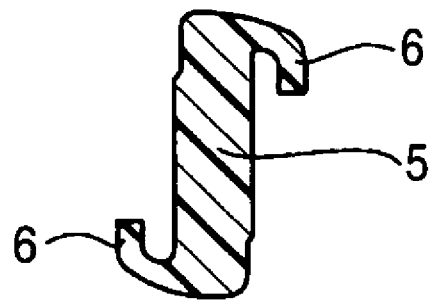
FIG. 10(A) is a cross-sectional view taken along line G-G in FIG. 9.
FIG. 10(B) is a cross-sectional view taken along line H-H in FIG. 9.
Figure 10:
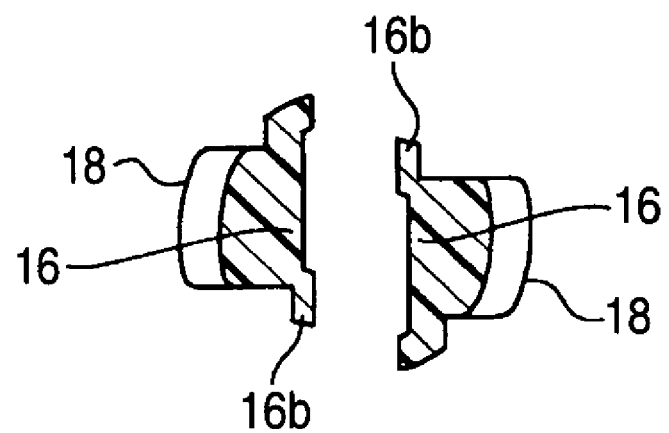

Next, a description will be given of a clip according to a second embodiment. The clip according to the second embodiment is basically same as the construction of the above-described first embodiment, but differs in that, first of all, as shown in FIGS. 9 and 10, the T-shaped ribbed walls 6 formed on both side surfaces of the shaft portion 5 of the first member 1 are omitted, and a pair of ribbed walls 6, which form an S-shape in cooperation with the prismatic shaped shaft portion 5, are newly formed continuously in the axial direction diagonally on both end faces of the shaft portion 5, a pair of side locking projections 21 being projectingly provided at distal end edges of the ribbed walls 6. The construction provided is such that when an attempt is made to pull out the shaft portion 5 of the first member 1 from the gap 17 between the split leg portions 16 of the second member 2, the side locking projections 21 are abutted against the U-grooves 14 formed in the lower surface of the flange portion 11 of the second member 2, thereby more reliably preventing the shaft portion 5 from coming off the gap 17.

For this reason, the connecting grooves 19 formed in the inner peripheral surfaces of the split leg portions 16 of the second member 2 are omitted and, instead, a pair of thin-walled engaging-in portions 16b, which are each inserted into a gap between a side surface of the shaft portion 5 and an inner surface of each ribbed wall 6, are integrally provided at end edges located diagonally on the split leg portions 16 of the second member 2. Thus, a construction is concurrently adopted in which in the state in which the shaft portion 5 of the first member 1 is inserted in the gap 17 between the split leg portions 16 of the second member 2, the shaft portion 5 and the lower end portions of the split leg portions 16 are connected to each other so as to be incapable of being moved away from each other, whereas in the case of pressing the leg portion 12 of the second member 2 into the mounting holes H1 and H2, the lower end portions of the split leg portions 16 are prevented from becoming inadvertently turned up.

Figure 11:
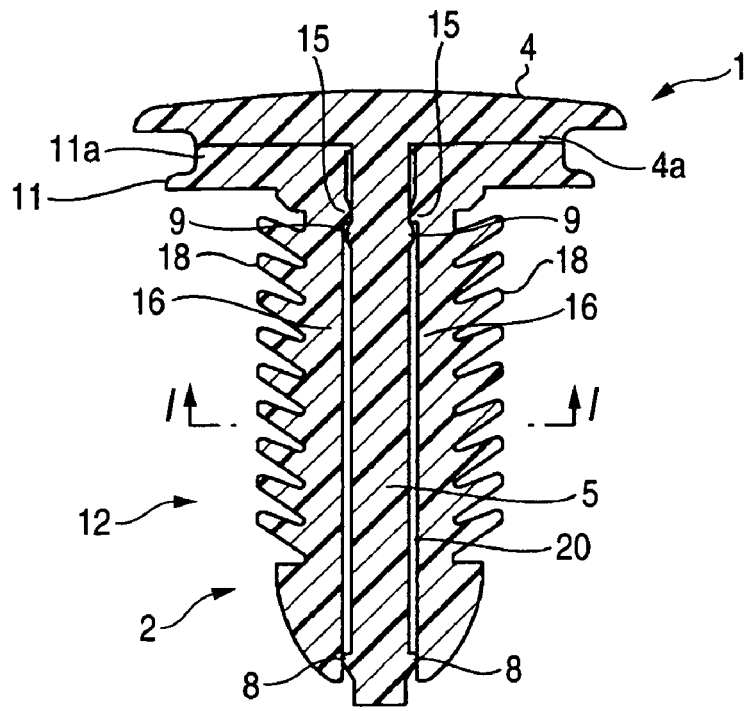
FIG. 11(A) is a cross-sectional view illustrating a state in which the first member and the second member are integrated.
FIG. 11(B) is a cross-sectional view taken along line I-I in FIG. 11(A)
Figure 11:
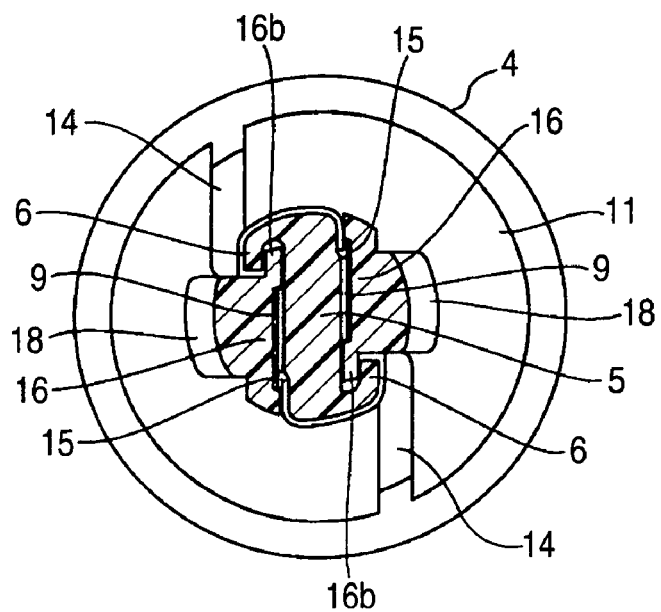

Secondly, as shown in FIG. 11, a stepped portion 4a is formed on the lower surface of the enlarged head portion 4 of the first member 1, and a stepped portion 11a opposing thereto is also formed on the upper surface of the flange portion 11 of the second member 2. The construction provided is such that in the integrated state of the first member 1 and the second member 2, a fixed gap is formed between the enlarged head portion 4 of the first member 1 and the flange portion 11 of the second member 2, with the result that if the operator tries to pull out the shaft portion 5 of the first member 1 from the gap 17 between the split leg portions 16 of the second member 2 while gripping the enlarged head portion 4 of the first member 1 with the operator's fingers, the enlarged head portion 4 of the first member 1 can be lifted up to facilitate the operation. It should be noted that it goes without saying that, in this case, the enlarged head portion 4 is greater in diameter than the flange portion 11.

Accordingly, in the case where the roof trim P1 is similarly fixed to the roof panel P2 by using the clip of the above-described construction, also in order to integrate the one-piece molded first member 1 and second member 2, if the small bridge pieces 3 are first cut off, and the shaft portion 5 of the first member 1 is inserted into the gap 17 formed between the split leg portions 16 of the second member 2, the first member 1 and the second member can be integrated. In this case, however, a fixed gap is formed between the enlarged head portion 4 and the flange portion 11, and the engaging-in portions 16b provided at the end edges of the split leg portions 16 of the second member 2 are each engaged in the gap between the side surface of the shaft portion 5 of the first member 1 and the inner surface of each ribbed wall 6, thereby allowing the split leg portions 16 to be connected to each other through the shaft portion 5 so as to be incapable of being moved away from each other.

After obtaining the state of integration of the first member 1 and the second member 2, the roof trim P1 is superposed on the roof panel P2 to obtain a state in which their mounting holes H1 and H2 are aligned, and the leg portion 12 is pressed into the mounting holes H1 and H2. Then, in the process in which the elastic blades 18 provided in multiple stages on the outer peripheral surfaces of the split leg portions 16 are passed through the mounting holes H1 and H2, the elastic blades 18 are pressed and curved by the inner peripheral surfaces of the mounting holes H1 and H2, and the elastic blades 18 after passing to the reverse surface side of the mounting holes H1 and H2 return to their original state, thereby preventing the second member 2 from coming off the mounting holes H1 and H2. As a result, in the same way as in the first embodiment, the roof trim P1 is fixed reliably and firmly to the roof panel P2, although not specifically shown.

In the case where the clip itself is conversely removed from the mounting holes H1 and H2 to cancel the fixed state of the roof trim P1 and the roof panel P2, if the operator tries to pull out the shaft portion 5 of the first member 1 from the gap 17 between the split leg portions 16 of the second member 2 while gripping the enlarged head portion 4 of the first member 1, which is lifted up due to the presence of the gap, with his or her fingers, the shaft portion 5 of the first member 1 is gradually pulled up from the gap 17 between the split leg portions 16 by making use of the gaps 20 each formed between the shaft portion 5 and each split leg portion 16. This time, the pair of locking projections 8 are inseparably engaged with the engaging shoulders 15 provided on the inner peripheral surfaces of the opening 13, and the newly provided pair of side locking projections 21 abut against the U-grooves formed in the lower surface of the flange portion 11. Therefore, by virtue of the action of the engagement of the pair and the abutment of the pair, it is possible to more reliably prevent the first member 1 and the second member 2 from becoming erroneously separated than in the case of the first embodiment. It should be noted that, inconsequence, there are no longer hindrances which hamper the mutual approach of the split leg portions 16 inside the gap 17, in the same way as in the first embodiment.

Figure 12:
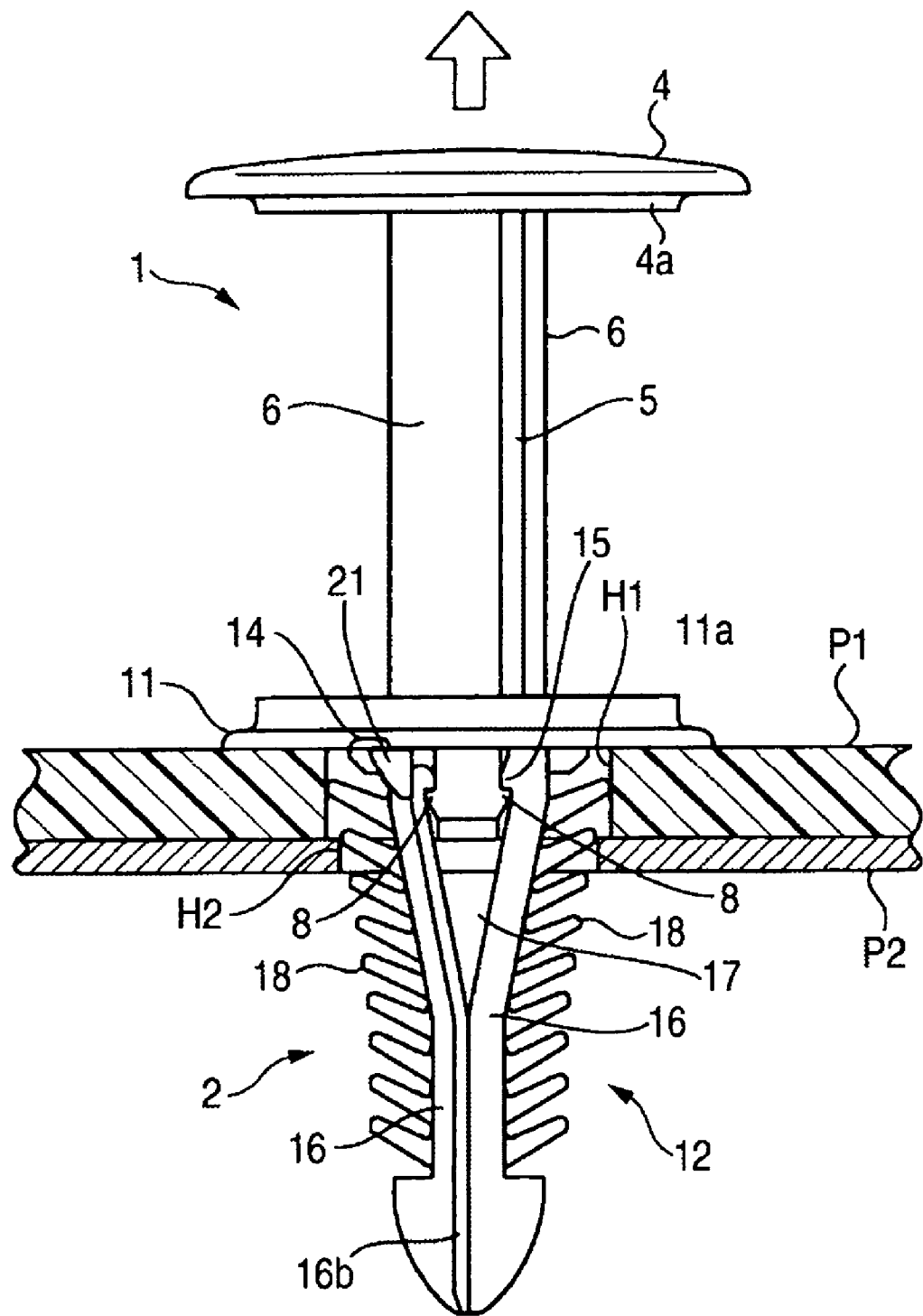
FIG. 12 is a cross-sectional view illustrating a state in which a pair of split leg portions is greatly deflected inwardly.

Accordingly, if the first member 1 is subsequently removed from the mounting holes H1 and H2 together with the second member 2 in the locked state while the enlarged head portion 4 of the first member 1 is continued to be gripped, the split leg portions 16 are greatly deflected inwardly by making use of the gap 17, as shown in FIG. 12. Therefore, even if the multi-stage elastic blades 18 are extended diagonally upward, it becomes practically unnecessary to curve the multi-stage elastic blades 18 in the opposite direction, so that the clip itself can be removed with a light force by the operator's fingers without using a tool in the conventional manner.

INDUSTRIAL APPLICABILITY

Unlike the convention alone-piece clip, the clip according to the invention is configured to include two parts including the first member and the second member, and the first member and the second member are used by being integrated in such a manner as to be capable of being pulled and inserted with respect to each other. Therefore, the clip according to the invention is quite suitable in cases such as when an upholstery material of an automobile, for which a need to cancel its fixed state arises, is fixed to a vehicle body panel.

The invention claimed is:

1. A clip comprising:
   a first member including:
      a head portion; and
      a shaft portion that is extended from a lower surface of the head portion; and
   a second member including:
      a flange portion that is formed with an opening; and
      a leg portion that is split into two split leg portions to form a gap therebetween into which the shaft portion is inserted, the gap communicating with the opening,
   wherein the split leg portions include a plurality of elastic blades projecting radially in multiple stages along a vertical direction on outer peripheral surfaces of the split leg portions,
   wherein a mutual approach of the split leg portions is prevented when the shaft portion of the first member is inserted into the gap between the split leg portions through the opening,
   wherein an engaging shoulder is provided on an inner peripheral surface side of the opening formed in the flange portion of the second member,
   wherein a locking projection is provided on an outer peripheral surface close to a distal end of the shaft portion of the first member, the locking projection being inseparably engaged with the engaging shoulder when the shaft portion is pulled out from the gap between the split leg portions,
   wherein an assembling projection is provided on the outer peripheral surface close to a proximal end of the shaft portion of the first member, and the assembling projection is separably engaged with the engaging shoulder on a second member side when the shaft portion is inserted into the gap between the split leg portions,
   wherein the assembling projections each includes an upper tapered surface and a lower tapered surface,
   wherein a plurality of inner peripheral surfaces of the split leg portions include a parallel portion that extends substantially in a longitudinal axis direction of the shaft portion,
   wherein the locking projection abuts the inner peripheral surfaces of the split leg portions within the parallel portion in a state where the assembling projection is engaged with the engaging shoulder, and
   wherein the upper tapered surface is tapered towards the head portion and the lower tapered surface is tapered away from the head portion.

2. The clip according to claim 1, wherein a side locking projection is provided on the outer peripheral surface close to the distal end of the shaft portion of the first member,
   wherein the side locking projection abuts against a lower surface of the flange portion of the second member outside the split leg portions in a state where the locking projection is engaged with the engaging shoulder, and
   wherein a distance between the side locking projection and the proximal end of the shaft portion is less than a distance between the locking projection and the proximal end of the shaft portion.

3. The clip according to claim 1, wherein, when the shaft portion of the first member is inserted into the gap between the split leg portions, at least the shaft portion and a lower end portion of each of the split leg portions are connected to each other so that the split leg portions are prevented from turning up, while when the shaft portion is pulled out from the gap between the split leg portions, a connection between the shaft portion and the lower end portion of each of the split leg portions is canceled.

4. The clip according to claim 1, wherein a portion of the shaft portion beneath a portion where the assembling projection of the first member is provided is formed as a narrow diameter portion.

5. The clip according to claim 1, wherein a U-groove that is parallel to each of the split leg portions is formed in the lower surface of the flange portion of the second member.

6. The clip according to claim 3, wherein a pair of ribbed walls are provided diagonally continuously on the shaft portion of the first member to allow the ribbed walls and the shaft portion to form an S-shaped cross section, and a pair of engaging-in portions which each engage into a gap between a side surface of the shaft portion and an inner peripheral surface of each of the ribbed walls are provided diagonally on the split leg portions of the second member.

7. The clip according to claim 1, wherein a distal end edge of the first member and an opening edge of the flange portion of the second member are integrally formed by a small bridge piece, and the head portion of the first member is subsequently pressed to integrate the shaft portion of the first member and the leg portion of the second member.

8. The clip according to claim 7, wherein the shaft portion of the first member comprises a central portion formed in a prismatic shape, and a T-shape is imparted to each of both sides of the central portion, T-shaped portions on a distal end side of the shaft portion being shaved off into tapered surfaces, to thereby form a remaining portion of the distal end of the shaft portion into a rectangular cross-sectional shape, the shaft portion of the first member being connected at four corners of the rectangular cross-sectional shape to an opening edge of the flange portion of the second member by means of small bridge pieces.

9. The clip according to claim 1, wherein the shaft portion of the first member has a central portion formed in a prismatic shape, and a T-shape is imparted to each of both sides of the central portion, T-shaped portions on a distal end side of the shaft portion being shaved off into tapered surfaces, to thereby form a remaining portion of the distal end of the shaft portion into a rectangular cross-sectional shape, the locking projection being provided at a portion of the rectangular cross-sectional shape.

10. The clip according to claim 1, wherein the shaft portion of the first member has a prismatic shape, and corner portions which are present diagonally on the first member are notched, while the gap formed between the split leg portions of the second member is made similar to a cross-sectional shape of the shaft portion.

11. The clip according to claim 1, wherein, if the first member is pressed fully into the second member, a gap is formed between the head portion of the first member and the flange portion of the second member, and an outside diameter of the head portion is made larger than an outside diameter of the flange portion.

12. The clip according to claim 1, wherein a lower portion of the head portion of the first member comprises a recess radially inward and an upper portion of the flange portion of the second member comprises a recess radially inward, so that when the first member is fully inserted into the second member a gap remains between an upper portion of the head portion of the first member and a lower portion of the flange portion of the second member.

13. The clip according to claim 5, wherein the U-groove is formed on both of a plurality of halves of the lower surface of the flange portion of the second member.

14. The clip according to claim 7, wherein the small bridge piece comprises a plurality of small bridge pieces.

15. The clip according to claim 1, wherein, when the first member is engaged with the second member by a frictional force when fully inserted into the second member, the first member disengages from the second member by applying a pulling force to the head portion of the first member.

16. A clip comprising:
a first member including:
 a head portion; and
 a shaft portion that is extended from a lower surface of the head portion; and
a second member including:
 a flange portion that is formed with an opening; and
 a leg portion that is split into two split leg portions to form a gap therebetween into which the shaftrtion is inserted, the gap communicating with the opening,
wherein the split leg portions include a plurality of elastic blades projecting radially in multiple stages along a vertical direction on peripheral surfaces of the split leg portions,
wherein a mutual approach of the split leg portions is prevented when the shaft portion of the first member is inserted into the gap between the split leg portions through the opening, wherein engaging shoulder is provided on an inner peripheral surface side of the opening formed in the flange portion of the second member,
wherein a locking projection is provided on an outer peripheral surface close to a distal end of the shaft porion of the first member, the locking projection being inseparably engaged with the engaging shoulder when the shaft portion is pulled out from the gap between the split leg portions,
wherein an assembling projection is provided on the outer peripheral surface close to a proximal end of the shaft portion of the first member, and the assembling projection is separably engaged with the engaging shoulder on a second member side when the shaft portion is inserted into the gap between the split leg portions,
wherein the assembling projections each includes an upper tapered surface and a lower tapered surface,
wherein a plurality of inner peripheral surfaces of the split leg portions include a parallel portion that extends substantially in a longitudinal axis direction of the shaft portion,
wherein the locking projection abuts the inner peripheral surfaces of the split leg portions within the parallel portion in a state where the assembling projection is engaged with the engaging shoulder, and
wherein, in a state where the assembling projection is engaged with the engaging shoulder, a gap is formed between the outer peripheral surface of the shaft portion and the inner peripheral surfaces of the split leg portions along an axial-direction range between the assembling projection and the locking projection.

* * * * *